United States Patent
Ramon et al.

(10) Patent No.: US 9,425,962 B2
(45) Date of Patent: Aug. 23, 2016

(54) LOW ENERGY BLUETOOTH SYSTEM WITH AUTHENTICATION DURING CONNECTIONLESS ADVERTISING AND BROADCASTING

(71) Applicant: INTEL IP CORPORATION, Santa Clara, CA (US)

(72) Inventors: Roy Ramon, Hod Hasharon (IL); Raz Weizman, Beer Sheva (IL); Mats Agerstam, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 103 days.

(21) Appl. No.: 13/923,662

(22) Filed: Jun. 21, 2013

(65) Prior Publication Data

US 2014/0378057 A1    Dec. 25, 2014

(51) Int. Cl.

| | | |
|---|---|---|
| *H04B 7/00* | (2006.01) | |
| *H04L 9/32* | (2006.01) | |
| *H04W 12/06* | (2009.01) | |
| *H04L 29/06* | (2006.01) | |
| *H04W 12/02* | (2009.01) | |
| *H04W 84/18* | (2009.01) | |

(52) U.S. Cl.
CPC ............... *H04L 9/32* (2013.01); *H04L 9/3236* (2013.01); *H04W 12/06* (2013.01); *H04L 63/0435* (2013.01); *H04L 63/126* (2013.01); *H04L 2209/80* (2013.01); *H04W 12/02* (2013.01); *H04W 84/18* (2013.01)

(58) Field of Classification Search
CPC ... H04W 84/18; H04W 88/06; H04W 76/02; H04W 52/0229; H04W 8/005; H04M 1/7253; H04M 2250/02; H04B 7/2612; H04L 9/32; H04L 12/189
USPC ............. 455/41.2, 410, 411, 418–420, 422.1
See application file for complete search history.

(56) References Cited

U.S. PATENT DOCUMENTS

2013/0165044 A1*  6/2013  Xie et al. ..................... 455/41.2
2013/0263211 A1*  10/2013  Neuman et al. .................. 726/1
2014/0237611 A1*  8/2014  Dent ............................... 726/26

* cited by examiner

*Primary Examiner* — Nhan Le
(74) *Attorney, Agent, or Firm* — Salehi Law Group

(57) ABSTRACT

Validation information is communicated in a Bluetooth Low Energy (BLE) connected session. Validation data is generated using said validation information. An advertisement string is broadcast from the BLE device in a connectionless session along with said validation data.

15 Claims, 8 Drawing Sheets

LOW ENERGY BLUETOOTH SYSTEM WITH AUTHENTICATION DURING CONNECTIONLESS ADVERTISING AND BROADCASTING

BACKGROUND

1. Technical Field

This disclosure pertains to wireless communication and more particularly to devices that perform connectionless communications, and, in particular, low energy Bluetooth (BLE) devices and methods.

2. Background

The Bluetooth Specification includes both connected and connectionless sessions. Connectionless sessions may be referred to in the art as advertising or broadcasting sessions. As detailed in the Bluetooth Specification, security and authentication elements are employed only in a connected session between two BLE devices. There are no security elements during connectionless sessions. An example of a Bluetooth system is illustrated in FIG. 1. This example shows Bluetooth devices, 102, 104, 106 and 108. Devices 102 and 108 are shown communicating in a connected process, as illustrated by arrows 111 and 112, while Bluetooth devices 102 and 104 are communicating in a connectionless process, as illustrated by arrow 115. Device 102 is broadcasting an advertising message. No security is available for this message. Likewise, No security is available for an advertising communication between BLE device 102 and BLE device 106 as shown by line 116. "No security" in this context means at least that it is not possible to determine what device is sending the message or whether the message has been corrupted. Device 106 may also be advertising, with no security available. Thus, device 104 cannot tell which advertisement is coming from which BLE device. At the time of this disclosure, security is available in BLE only while using the connected profile, which security is typically provided using a hardware authentication chip. Further, there are disadvantages in that it is necessary to define the master and slave, and utilize two-way traffic that is limiting from power consumption, latency and use case aspects.

There are instances in which frequent and significant use is made of connectionless sessions, such as Contiguity Profile where it is used for discovery and proximity measurements. Authentication is desirable in such instances, as often there are many BLE devices advertising or broadcasting within BLE range, and errors and security vulnerabilities can occur if one BLE advertisement or broadcast is mistaken for another. Therefore, it would be highly desirable if an apparatus and process were available that allowed connectionless authentication of BLE advertisements, broadcasts, and devices.

BRIEF DESCRIPTION OF THE DRAWINGS

The invention will become clearly understood from the following detailed description read together with the drawings in which.

DETAILED DESCRIPTION OF THE DRAWINGS

Figure 1:
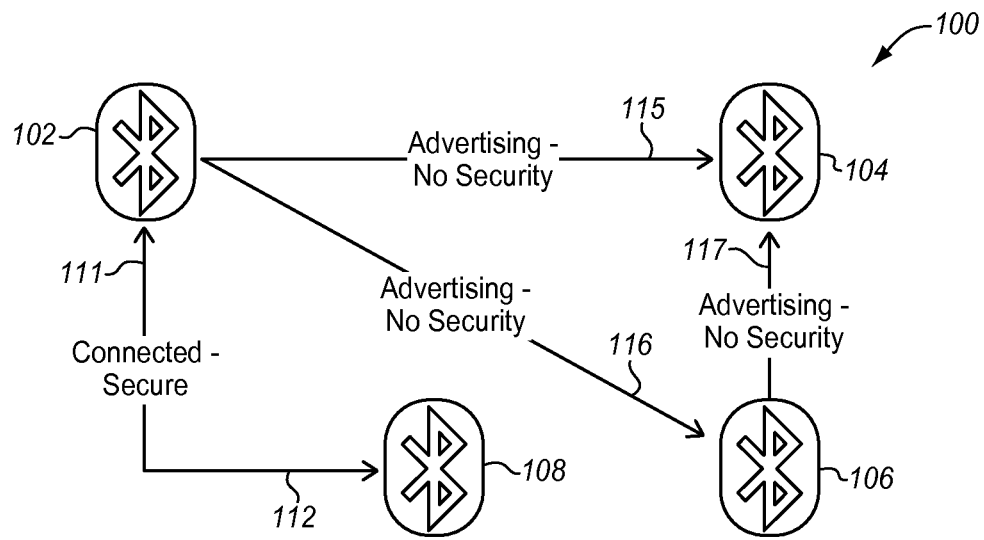
FIG. 1 is a diagrammatic view illustrating examples of a connected session and examples of connectionless sessions in the prior art.

Embodiments disclosed herein relate to low energy Bluetooth radio communications or BLE. Bluetooth is a technology for short distance radio transmission in a band from 2.4 to 2.5 Gigahertz (GHz). Bluetooth low energy (BLE) is a feature of Bluetooth 4.0 wireless radio technology. While BLE radio circuits are similar to traditional Bluetooth radio circuits, BLE is otherwise significantly different than classic Bluetooth. BLE is aimed at low-power and low-latency, applications for wireless devices within a short range of up to 50 meters. BLE devices consume much less power than prior art Bluetooth circuits, and have the ability to operate for months or even a year on a single battery the size of a nickel or quarter without recharging, thus permitting communication devices such as sensors, including discovery and proximity sensors, and radio transmitters in pacemakers to operate for long periods of time Bluetooth is managed by the Bluetooth Special Interest Group (SIG) and was standardized as IEEE 802.15.1, though this standard is no longer applicable to either Bluetooth or BLE. The low power consumption of BLE results from the low duty cycles of the BLE protocol. As indicated above, the rate of power usage during operation is similar to classic Bluetooth, though the BLE protocol stack allows the BLE device to be in a sleep mode most of the time. BLE has a much lower bit rate than classical Bluetooth, but has a much shorter set-up time on the order of 0.003 seconds, for example, allowing a large number of devices to be set up in a short time. Under the BLE specification, both connected and connectionless sessions are available. Secure sessions are set up using the connected profile, sometimes using a hardware authentication chip. The connected profile requires the definition of a master BLE unit and a slave BLE unit and essentially continuous two-way communication. These requirements negate one of the principal advantages of BLE, the very low power and resulting long lifetime for small batteries. One embodiment of this disclosure describes apparatus and methods to provide a significant level of security in connectionless BLE, in particular, the ability to uniquely identify the source of a connectionless signal, such as advertising or broadcast signal. In one embodiment, the present disclosure permits a BLE device to be authenticated to other BLE devices which are receiving its advertisement frames.

The following describes apparatus and processes for generating some security and authentication elements on connectionless sessions between BLE devices. The purpose of these security elements is to authenticate the BLE device to other devices which are getting its advertisement frames. The method described does not use the BLE connection and does not implement the entire BLE authentication process, but instead utilizes validation elements. The connectionless validation of a BLE device has a significant importance. It can create the ability to keep a BLE session connectionless while still permitting the authentication of the BLE device. In an embodiment described, the authentication takes place during BLE connectionless sessions, where generally one side is broadcasting and the other is only receiving, although it is possible that both sides are doing both.

Some terminology is useful for understanding the system and process disclosed herein. We refer to the type of authentication disclosed herein as validation. A BLE device can validate other BLE devices according to previously agreed parameters and methods where one device sends the validating data with its BLE advertisement data and the validator device confirms the validating data. After the process has completed, the validator knows that the validating device is the device it claims to be. We shall refer to a validation which occurs only at one point during a connectionless session as a session validation. We shall refer to a validation frame which is part of an ongoing set of continuous validation frames as a validation heartbeat. A validation heartbeat is typically sent once every few seconds, though it may beat at a faster or slower rate. BLE validation matching refers to the stage just prior to validation where the BLE devices exchange the validation details including the method of validation and all needed parameters. Session validation occurs when a BLE device wants to validate itself only once during the session. This involves a single validation heartbeat during the entire BLE session. Continuous validation is a process in which a BLE device wants to continually validate itself to the other device(s). In this case, it will use the validation heartbeat for this matter every X seconds, where X is typically one-half to ten seconds, though it may be shorter or longer.

A connectionless session is, for example, a unidirectional session where there may not be a possibility for an acknowledgement of the message arrival. Some messages may be lost and the sender has no way to know it. As an example, there is a total of 31 bytes of data per BLE frame, and only 26 bytes are available for validation. In one embodiment, BLE devices utilize a secured way to pass data, such as a shared key, hash function parameters or other validation policy to be used in the validation process. This is referred to as BLE validate matching. In one embodiment, the validation is preformed over an open channel. In one embodiment, the validation is performed over a channel such as an RFCOMM, TCP, or UDP channel and others.

Figure 2:
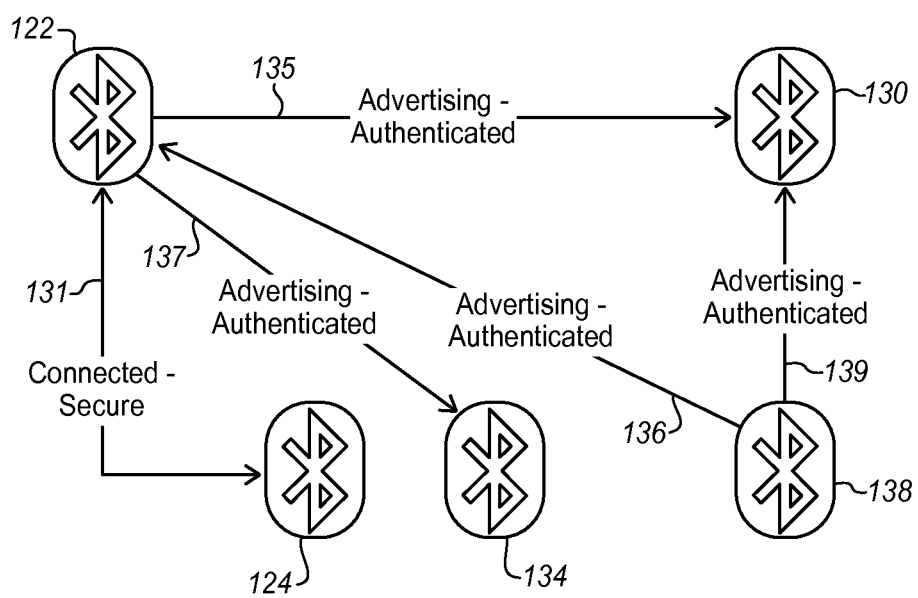
FIG. 2 is a diagrammatic view illustrating one embodiment of an authenticated advertising process according to the invention.
Figure 3:
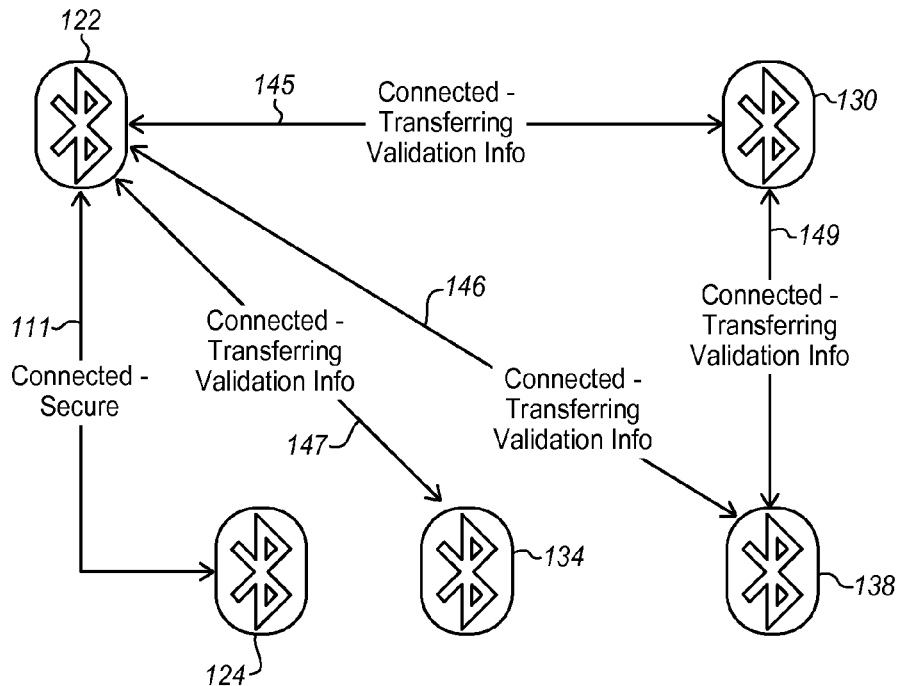
FIG. 3 is a diagrammatic view illustrating embodiments of a validation information transfer process according to the invention.
Figure 4:
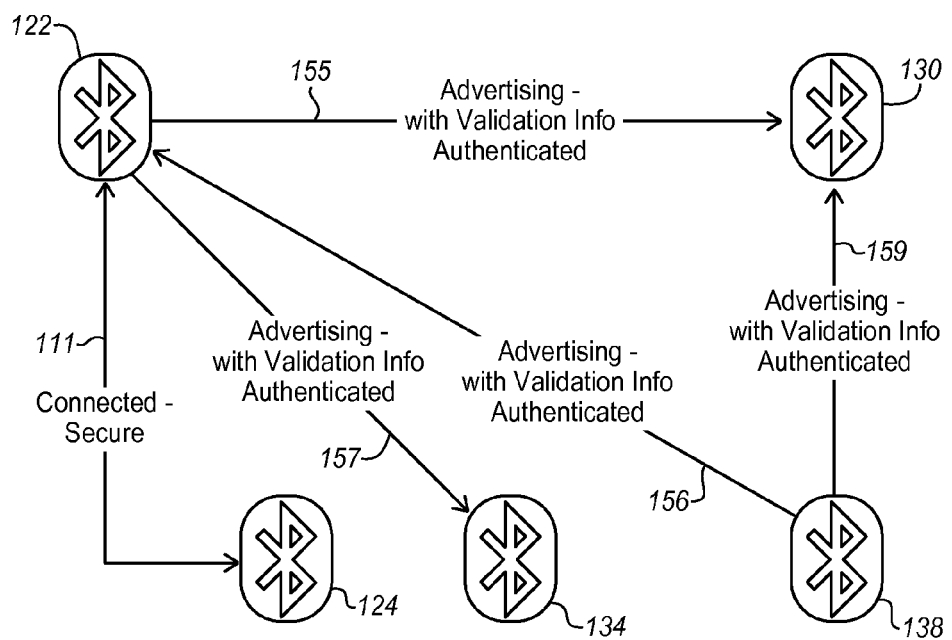
FIG. 4 is a diagrammatic view illustrating embodiments of the invention using the validation information transferred in the processes of FIG. 3 to authenticate BLE devices as they advertise.

FIG. 2 is a diagrammatic view illustrating one embodiment of an authenticated advertising process. The embodiment of FIG. 2 includes BLE devices 122, 124, 130, 134 and 138. Devices 122 and 124 are illustrated as in a connected session which has high security through radio connection 131. BLE device 122 is also advertising in a connectionless session with authentication. Device 130 receiving the advertising from device 122 and authenticating that the advertisement is coming from device 122. Device 134 also receives the advertising from device 122 and authenticates that the advertising message is coming from device 122. BLE device 138 is also advertising in a connectionless session. BLE device 122 receives the advertising frames and authenticates that the advertising signal is coming from device 138. Device 130 also receives the advertisement from device 138 and authenticates that it is coming from device 138. Thus, device 130 can distinguish which advertisement is coming from device 122 and which advertisement is coming from device 138. This provides many advantages. As will be seen in the following, this authentication is provided with little overall increase in power consumption. FIGS. 3 and 4 illustrate how this is accomplished.

FIG. 3 is a diagrammatic view illustrating the system of FIG. 2 participating in validation information transfer processes according to the invention. The same five BLE devices 122, 124, 130, 134, and 138 are shown. Devices 122 and 124 are participating in the same connected and secure process via connection 111 as illustrated in FIG. 2. In this process, BLE device 122 is the master and BLE device 124 is the slave. Also shown is a connected session between BLE device 122 and BLE devices 130 and 134, illustrated by lines 145 and 147. In this process, BLE device 122 is the master and BLE devices 130 and 134 are the slaves. Data can be transferred only between the master and one slave device at a time. Master 122 choses which of slave devices 124, 130 and 134 to address and switches rapidly from one slave device to another in a round-robin fashion. Also shown in FIG. 3 is a second connected session between device 138 and devices 122 and 130 as illustrated by lines 146 and 149. In this session, BLE device 138 is the master and BLE devices 122 and 130 are slaves. The session illustrated by lines 146 and 149 may take place within a different time frame than the connected process illustrated with lines 145 and 147.

FIG. 4 is a diagrammatic view illustrating embodiments using the validation information transferred in the processes of FIG. 3 to authenticate BLE devices as they advertise. BLE device 122 is again in a connected session with BLE device 124. It is also advertising or broadcasting in connectionless sessions with BLE devices 130 and 134. As will be seen in more detail below, BLE device 122 is including in the broadcasted frames validation information provided with the exchanges illustrated with lines 145 and 147 in the processes of FIG. 3. FIG. 4 also shows a connectionless session in which BLE device 138 is broadcasting and BLE devices 130 and 122 are receiving the advertisement. The broadcast of device 138 includes validation information provided in the connected session illustrated by lines 146 and 149 of FIG. 3. Using the validation information, BLE devices 130 and 134 can determine that the advertisement illustrated by lines 155 and 157 originated at BLE device 122 and BLE devices 122 and 130 can determine that the advertisement of lines 156 and 159 originated from BLE device 138.

Figure 5:
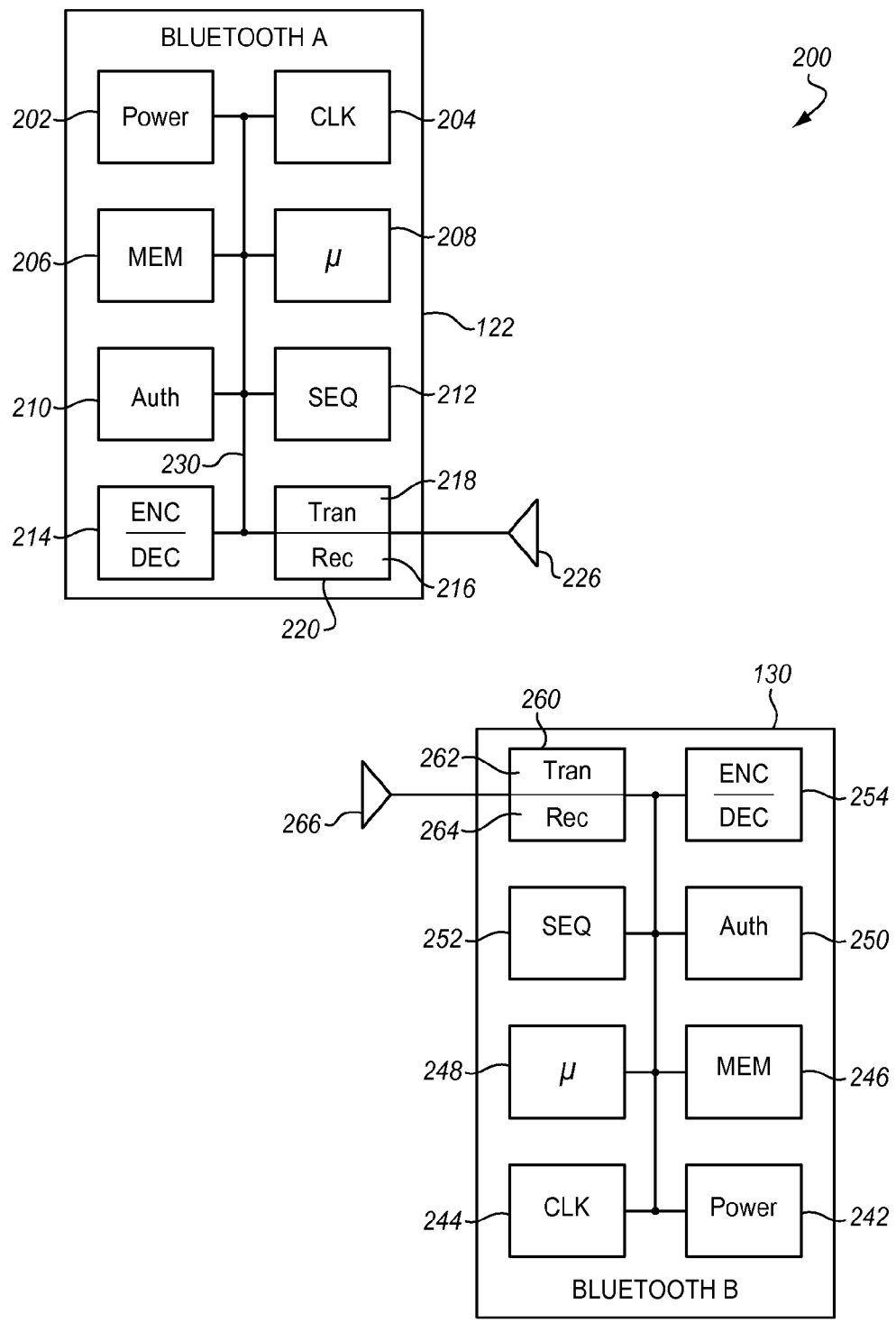
FIG. 5 is a block diagrammatic view of an embodiment of a BLE system according to the invention.

FIG. 5 is a block diagrammatic view of an embodiment 200 of a BLE system according to the invention. In this example, we illustrate a BLE system comprising BLE devices 122 and 130. BLE device 122 identified as Bluetooth A includes power module 202, clock 204, memory 206, microprocessor 208, authentication module 210, sequencing module 212, encryption/decryption module 214 and Bluetooth radio module 220, which includes transmitter 218, receiver 216 and antenna 226, all of which are connected by bus 230. BLE device 130 identified as Bluetooth B includes power module 242, clock 244, memory 246, microprocessor 248, authentication module 250, sequencing module 252, encryption/decryption module 254 and Bluetooth radio module 260, which includes transmitter 262, receiver 264 and antenna 266, all of which are connected by bus 230. One skilled in the art will understand that clock 204 may be included in microprocessor 208 or any of the other components of Bluetooth A, memory 206 may be embedded in microprocessor 208, authentication module can be integrated into Bluetooth device 122 or be a separate chip, encryption/decryption module 214 may be implemented as software stored in memory 206 and executed by microprocessor 208, as may be authentication module 210 and sequencing module 212. Likewise all the modules may be integrated into a single chip or implemented by separate chips. Similarly for BLE device 130.

Figure 6:
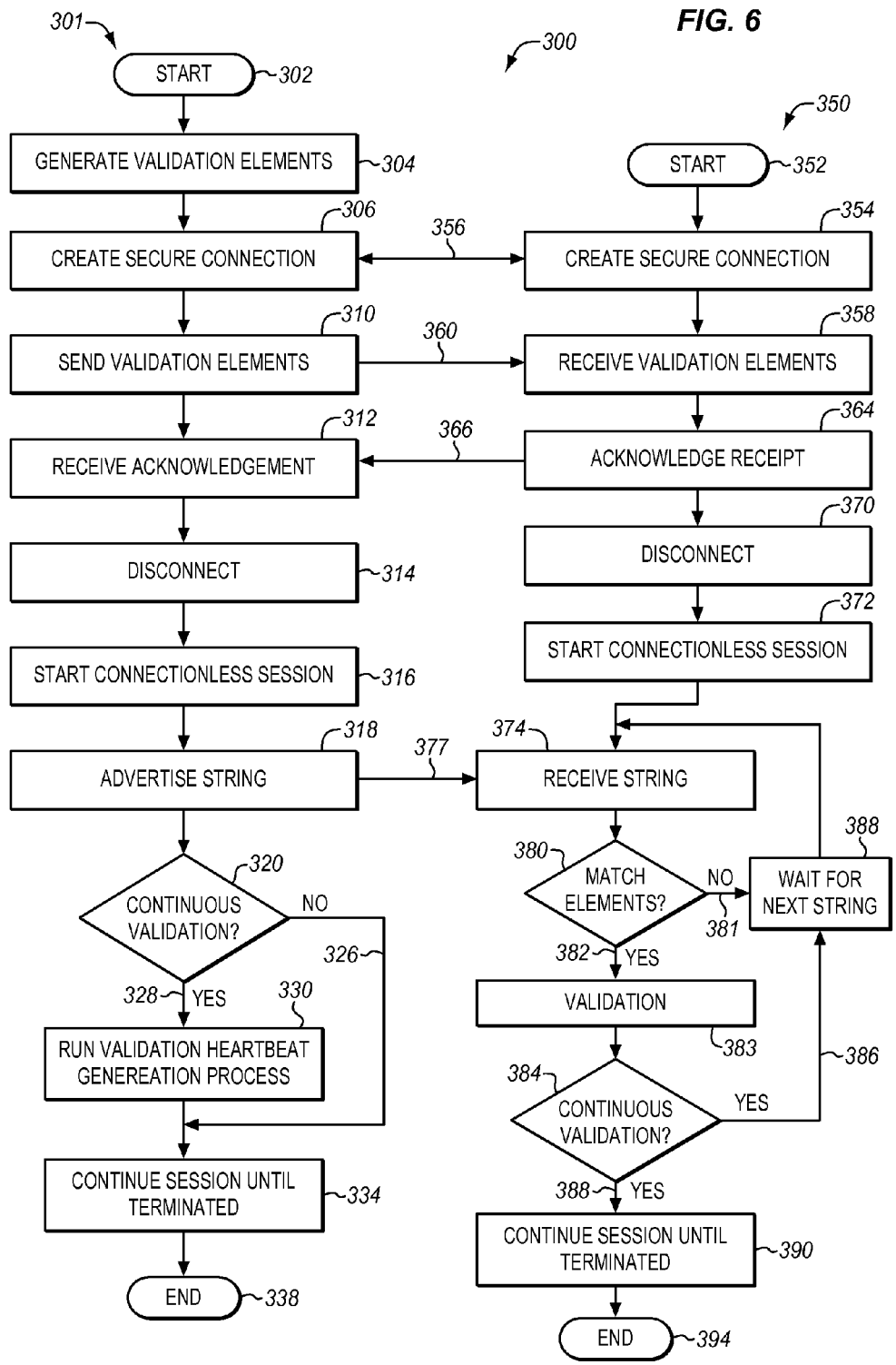
FIG. 6 is a pair of flow charts illustrating an embodiment of an authentication process according to the invention.

FIG. 6 is a pair of flow charts illustrating an embodiment 300 of an authentication process. This embodiment includes a flow 301 that may take place in a first BLE device, such as BLE device A, and a second complementary flow 350 that may be taking place in a second BLE device, such as BLE device B, which is in communication with first BLE device A. Flow 301 starts at 302 and flow 350 starts at 352. In sub-process 304 validation elements are generated by BLE device A and stored in memory 206. In sub-processes 306 and 354 a secure connection is created between BLE device A and BLE device B. In sub-process 310 the validation elements are transmitted by BLE device A and in sub-process 358 the validation elements are received at BLE device B and stored in memory 246. In sub-process 364 the receipt of the validation elements is acknowledged by BLE device B and in sub-process 312 the acknowledgement is received by BLE device A. The connected session is terminated in sub-process 314 and sub-process 370.

Figure 7:
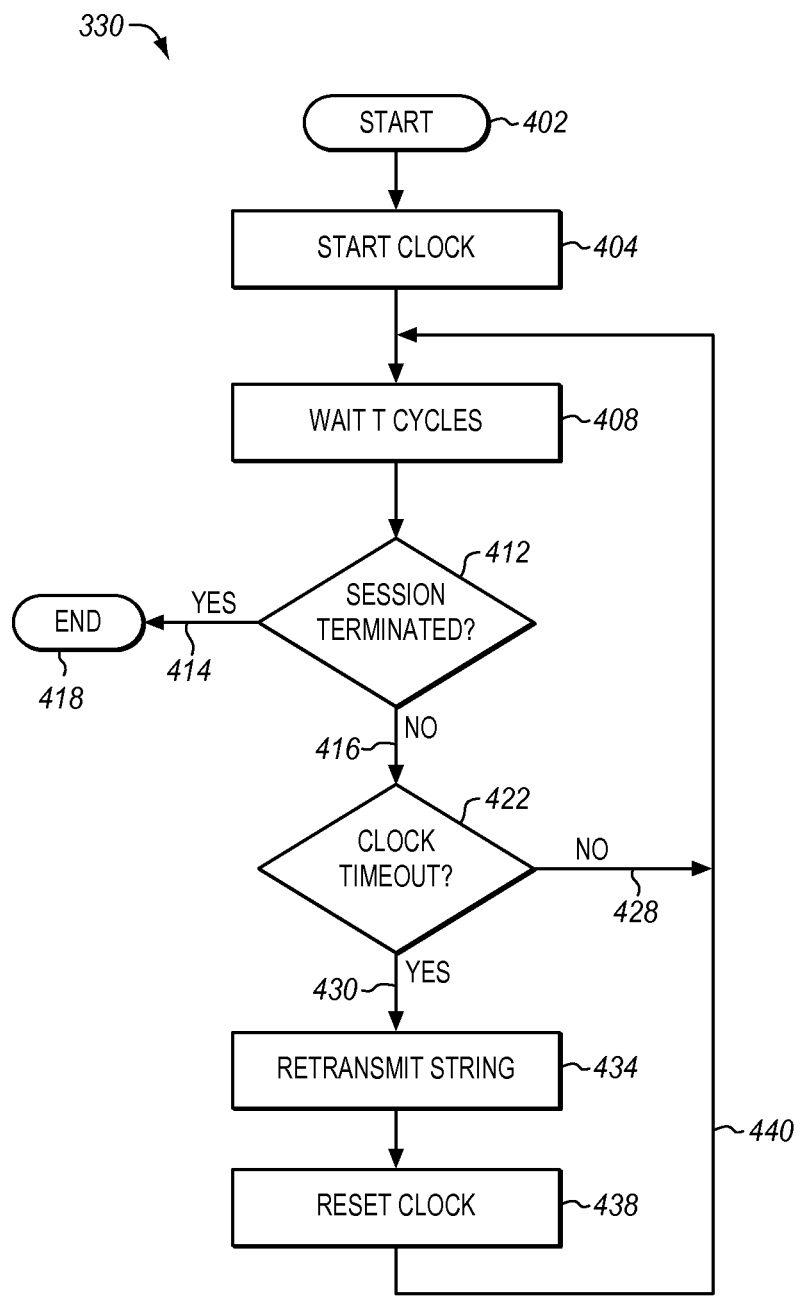
FIG. 7 is a flow chart illustrating an embodiment of a process for generating a continuous validation according to the invention.

A connectionless session is started at sub-processes 316 and 372. At sub-process 318 BLE device A transmits an advertisement string, which is received by BLE device B at sub-process 374. BLE device B matches the validation elements to the elements stored in memory 246 in sub-process 380. If no match is found for the elements, the flow goes to sub-process 368 via route 381 where the system waits for the next string. If there is a match, the flow passes to sub-process 383 via route 382, and in sub-process 383 BLE B authenticates that the string came from BLE A. The flow then goes to sub-process 384 where it checks the continuing validation flag, and if it is set, the process flows to sub-process 368 via route 386, where it waits for the next string. If the continuous validation flag is not set, the flow passes via route 388 to sub-process 390, where the connectionless session is continued until terminated. Upon termination of the connectionless session, the flow ends at sub-process 394. Meanwhile, after sending the advertisement at sub-process 318, BLE device B checks to see if the continuous validation flag is set at sub-process 320. If it is, the flow goes to sub-process 330 via route 328 and the continuous validation generation process is run, which process is shown in FIG. 7. If the continuous validation flag is not set, the flow goes to sub-process 334 via route 326, where the connectionless session is continued until terminated, whereupon the flow ends at sub-process 338.

FIG. 7 is a flow chart illustrating an embodiment of a process 330 for generating a continuous validation according to the invention, that is for generating a validation heartbeat. The heartbeat process starts at 402. At sub-process 404, clock 204 is started. The system waits for T ticks or cycles which may be the tick of the system clock, or some multiple thereof. After T ticks, the flow goes to sub-process 412, where the BLE device checks to see if the session has been terminated. If the session has been terminated, the flow goes to sub-process 428 via route 414, and at sub-process 428 the flow ends. If the session has not been terminated, the flow goes to sub-process 422 via route 416 where it checks whether the clock has timed out. If the clock has not timed out, the flow goes back to sub-process 408 via route 428. If the clock has timed out, the flow goes to sub-process 434 via route 430. In sub-process 434, BLE A retransmits the advertisement with the string that includes the validation parameters, which transmission is received by BLE A at sub-process 374 as described above. When the string has been retransmitted, the clock is reset at sub-process 438, then the flow proceeds to sub-process 408 via route 440 and the heartbeat continues until the session is terminated.

Figure 8:
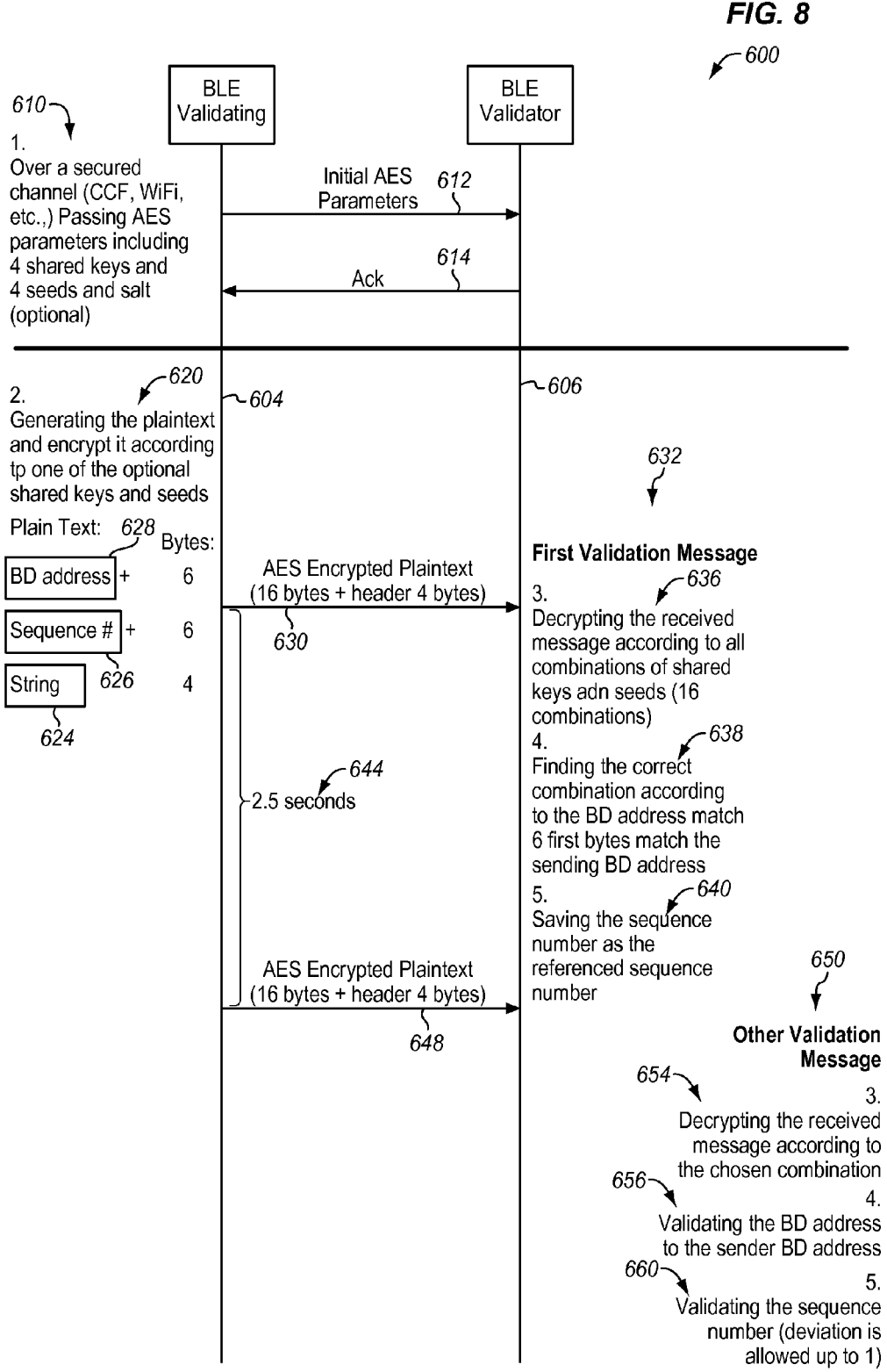
FIG. 8 is a flow chart illustrating one embodiment of an encryption type authentication process according to the invention.

FIG. 8 is a flow diagram illustrating one embodiment 600 of an encryption type authentication process according to the invention. The encryption process of this exemplary embodiment uses the Advanced Encryption Standard (AES) to encrypt a string in the validating device and decrypt it in the validator device. In FIG. 8 the processes of the flow are illustrated in the context of a validating BLE device 604, that is, a BLE device that is identifying itself, and a validator BLE device 606, that is a BLE device that is determining the source of an advertisement. Process 600 starts at sub-process 610 with the passing of the initial encryption parameters between the validating (encrypting) device and the validator (decrypting) device over a secured connection. The elements include: a 4 AES shared key, 4 AES seeds, and, in one embodiment, a salt. This passing of parameters in indicated at 612. At 614 an acknowledgement is sent from validator BLE device 606 to validating BLE device 604. After this exchange, the secured connection is disconnected and not reconnected through the validation process. Validating device 604 start the validation process at 620 by generating a plain text sixteen bytes consisting of a 6 byte BD address 624, a 6 byte sequence number 626, and a random four byte string 628. The latter 4 byte string is padding which is changed for each message, but does not have meaning in the decryption. This is encrypted and sent with a header and a four byte message at 630.

In process 632, the message is received by the validator BLE 606 and decrypted at 636. The initial sequence number at a random number in the 6 byte range passed in sub-process 612. Then, at sub-process 636, the received message is decrypted according to the parameters passed in process 612. All combinations of shared keys and seeds are tried until the correct BD address and a sequence number within the specified range is obtained. In process 638 it is determined that the BD address is correct and the sequence number is in the proper range. After decrypting we will get the following products: BD address, sequence number, string (4 bytes). In process 640, the sequence number is saved, in memory 246. If the process 600 is a continuous validation process, that is a process with a heartbeat, then additional validation messages are sent and received at a predetermined rate, such as every 2.5 seconds, as shown in sub-process 650. These additional messages are decrypted according to the following rules: The BD address must match the BD address of the validating BLE device as passed in sub-process 612; the decrypted sequence number will need to match the range of the sequence number from the sender; The sequence number will have to be in the range of between n and n+m, of the previous received sequence number m, where n–m is the number of sequence numbers that have passed, and no prior sequence numbers will be accepted. If the sequence number doesn't match these terms, a new session will have to open with a new sequence number. A small deviation is allowed as it is possible that a message can be missed.

Figure 9:
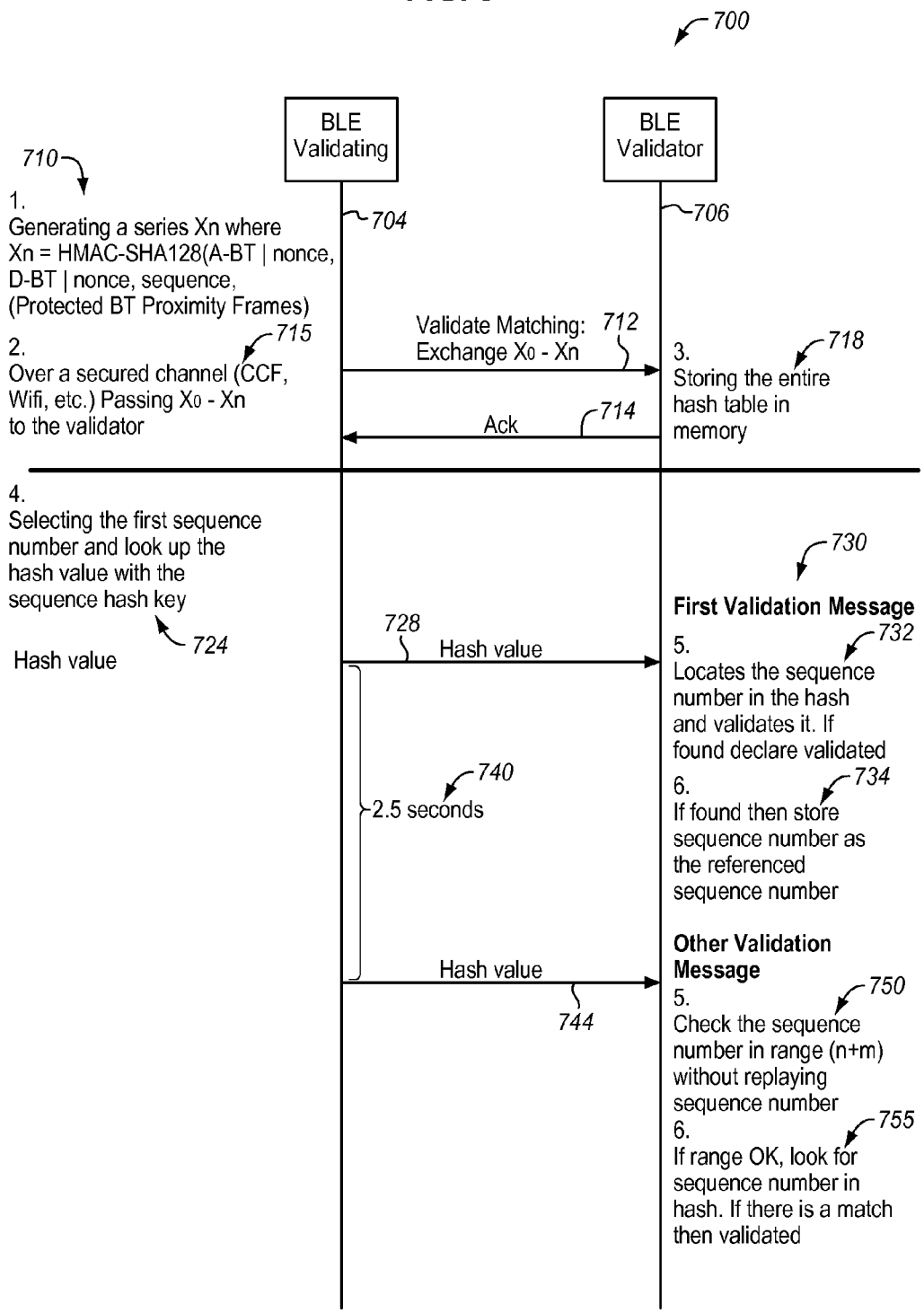
FIG. 9 is a flow chart illustrating one embodiment of an HMAC type authentication process according to the invention.

FIG. 9 is a flow diagram illustrating another embodiment 700 of the invention. In this embodiment, a Hash-Based Message Authentication Code (HMAC) type process is used. Again, in FIG. 9 the process is described by referring to a first BLE device 704, which is the validating BLE device and a second BLE device 706, which is the validator BLE device. In process 700, a 128 byte HMAC method (SHA128) is used to hash the sequence number on the validating device and the same method, using parameters passed in sub-process 710, is used to check the hashing scheme. In sub-process 710, a series Xn is generated of n sequence numbers and the corresponding hash values using an HMAC function (SHA128). This would be done by generating "n" protected Bluetooth Proximity Frames where, Xn=HMAC-SHA128(S-BT|source nonce, D-BT-|destination nonce, sequence number. Then, Xn is passed between the validating device 704 and the validator device 706 over a secured connection in sub-process 715, which transfer is illustrated at 712. The validator BLE device 706 then acknowledges the transfer as illustrated at 714, and the entire hash table is stored in memory 246 at sub-process 718. The secured connection is terminated.

When an advertisement is generated by BLE device 704, the first sequence number is also generated and the validation data is included in the message as Payload=[sequence, Xn] and the validation heart beat is sent to the validator as illustrated at 728. The validator BLE device 706 locates the sequence number in the hash, and, if found, the transmitting BLE is validated in sub-process 732. In sub-process 734, the sequence number is stored in memory 246. If the validation is a continuous or heartbeat validation, then after a predetermined time, such as 2.5 seconds at 740, a new hash value is sent with a new message as illustrated at 744. In sub-process 750 the sequence number is matched to the sequence number in the range of the validating device. The range will be n+m, where m is the number of frames. If the sequence number is in the proper range, then, in sub-process 755, the sequence number is located in the hash, and if it matches, the transmitting BLE device is validated. If there is no validation, then the process is restarted with a new sequence number.

Figure 10:
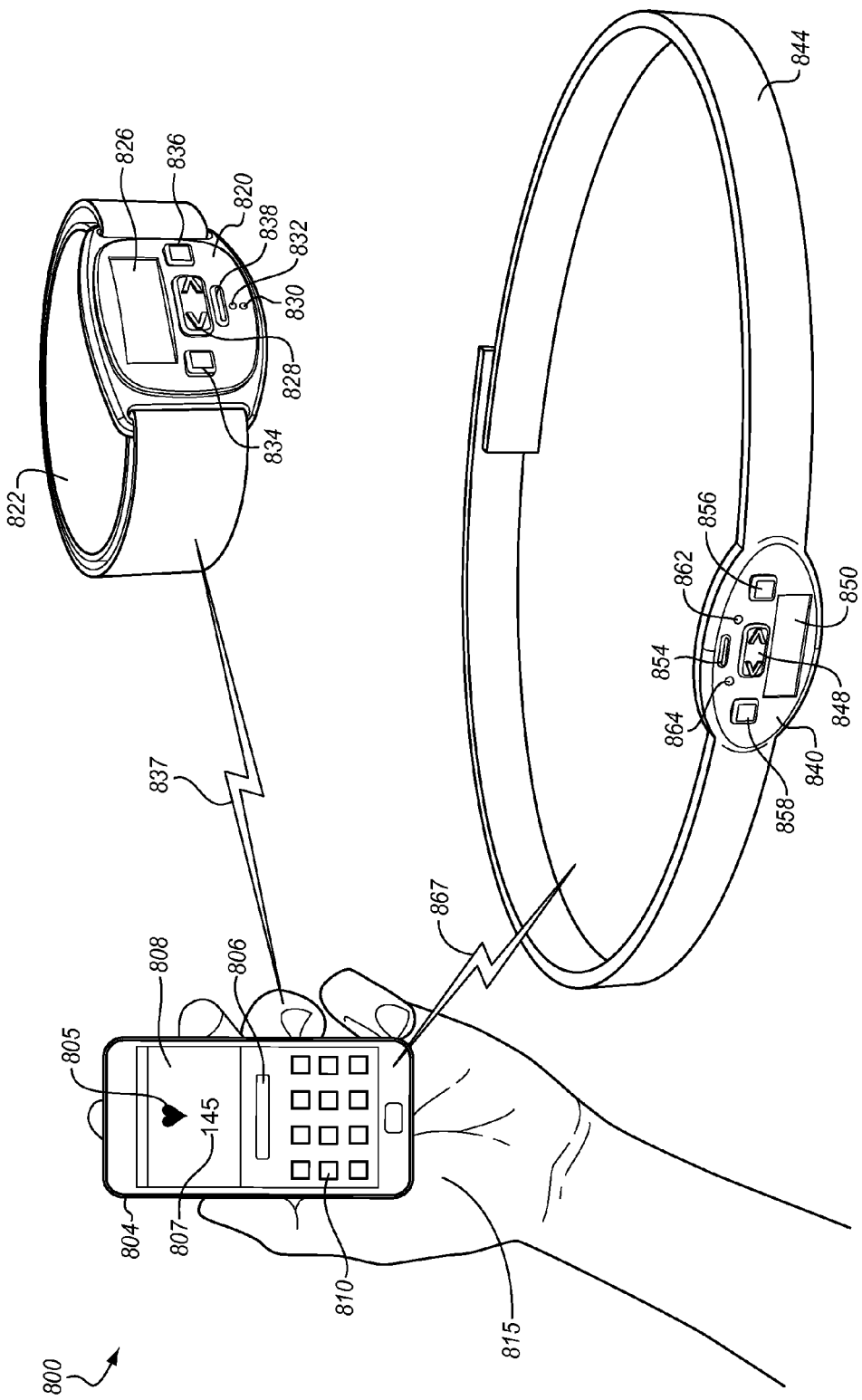
FIG. 10 shows a BLE system illustrating an embodiment that may be used in an athletic or health situation.

FIG. 10 shows a BLE system 800 illustrating an embodiment that may be used in an athletic or health situation. System 800 may include a BLE master control unit 804 that may, for example be a smart phone 804. System 800 also may include an activity monitor 820 that may be attached to a wrist band 822, and a heart rate monitor 840 that may be attached to a chest strap 844. Control unit 804 may include a display 808, a BLE transmitter/receiver 806, and a keypad 810. Control unit 804 is shown being held in a hand 815 of a human being. Activity monitor 820 may include a small display 826, a scroll button 828, keys 834 and 836 and indicator lights 830 and 832. Monitor 820 may also include a BLE device 838. Heart rate monitor 840 may include BLE device 854, a small display 850, a scroll button 848, keys 856 and 858 and indicator lights 862 and 864. A use case of any of the embodiments of a BLE system as described herein may be to allow control unit 804 to authenticate which of monitors 820 and 840 is the source of an activity advertisement 837 and which is the source of a heart rate advertisement 867. As suggested by heart 805 and heart beat rate 807, control unit 804 is shown receiving an advertisement signal 867 from heart rate monitor 840.

In one embodiment, there is a method to authenticate a Bluetooth Low Energy (BLE) connectionless communication, the method comprising: providing a BLE device having a memory; creating a secure, connected communication session with the BLE device; communicating validation information in the connected session; storing the validation information in the memory; receiving, in a connectionless session, a broadcast including an advertisement string and validation data; and authenticating the source of the broadcast using the validation data and the validation information. In one embodiment, the authenticating is performed only once during the connectionless session. In another embodiment, the authenticating is performed a plurality of times at predetermined time intervals during the connectionless session. In a further embodiment, the broadcast is received over an open channel. In one alternative, the validation data comprises a sequence number. In another alternative, the validation data comprises transmitting a shared key. In one embodiment, the authenticating comprises an Advanced Encryption Standard (AES) process. In one alternative, the authenticating comprises a 4 AES process. In another embodiment, the authenticating comprises a Hash Based Message Authentication Code (HMAC) function.

In one embodiment, there is a Bluetooth Low Energy (BLE) system comprising: a BLE radio transceiver; an electronic memory; a microprocessor in communication with the electronic memory and to connect the BLE transceiver in a connected session, to receive validation information in the connected session and to store it in the electronic memory, to receive an advertising string and validation data in a connectionless session; and to authenticate the broadcasted advertising string using the validation information and the validation data. In one alternative, the validation data comprises a sequence number. In another alternative, the validation data comprises an encrypted Bluetooth device (BD) address. In a further alternative, the validation data comprises a hash value. In one embodiment, the BLE system further includes an authentication chip electrically connected to the microprocessor.

There is also a Bluetooth Low Energy (BLE) system to authenticate the source of an advertisement broadcast in a connectionless session, the system comprising: a BLE radio transceiver; an electronic memory; a clock; a microprocessor in communication with the electronic memory and the clock to: connect the BLE transceiver in a connected session, to transfer validation information in the connected session and store it in the electronic memory, to generate validation data using the validation information, and to broadcast an advertising string and the validation data in a connectionless session; and wherein the electronic memory and the microprocessor together form an encryptor. In one embodiment, the BLE system further comprises an authentication chip electrically connected to the microprocessor. In another embodiment, the electronic memory and the microprocessor further comprise a sequencer. In one alternative, the system further comprises a keypad electronically communicating with the microprocessor. In another alternative, the system further comprises a display communicating with the microprocessor.

There is also a product including a non-transitory storage medium having stored thereon instructions that, when executed by a machine, result in: creating a secure, connected Bluetooth low energy (BLE) communication link; exchanging validation information over the secure, connected communication link; storing the validation information in the computer readable medium; generating validation data using the validation information; broadcasting an advertisement string from a BLE device in a connectionless session; and transmitting the validation data along with the advertisement string. In one embodiment, the non-transitory storage medium includes instructions for encrypting a plaintext message. In another embodiment, the non-transitory storage medium includes instructions for encrypting a Bluetooth Device (BD) address.

There is also a Bluetooth Low Energy (BLE) system comprising: a BLE radio transceiver; an electronic memory containing validation information; and means for generating validation data using the validation information, and for broadcasting an advertising string and the validation data in a connectionless session. In one embodiment, the validation data comprises a sequence number. In another embodiment, the validation data comprises an encrypted Bluetooth device (BD) address. In a further embodiment, the validation data comprises a hash value. In a further embodiment, the BLE system further includes an authentication chip.

There is also a machine readable medium including code, when executed, to cause a machine to perform any of the methods above. In one embodiment, the machine readable medium comprises; a computer readable medium in a BLE device having a processing unit; the computer readable medium embodying instructions for directing the processing unit to: create a secure, connected communication session; communicate validation information over the secure, connected communication link; store the validation in formation in the computer readable medium; generate validation data using the validation information; and broadcast an advertisement string along with the validation data in a connectionless session. In another embodiment, the computer readable medium includes instructions for encrypting a plaintext message. In a further embodiment, the computer readable medium includes instructions for generating a hash value.

There have been described novel BLE methods, systems and devices. Now that embodiments have been described, those skilled in the art will be able to adapt them to other BLE methods, systems and devices. It will also be evident to those skilled in the art that the various parts of the embodiments may be combined in many different ways. It should be understood that each of the processes and apparatus described can be combined with any of the other processes and apparatus. After review of this disclosure, additional advantages and modifications will readily appear to those skilled in the art.

What is claimed is:

1. The method to authenticate a Bluetooth Low Energy (BLE) connectionless communication, said method comprising:
   providing a BLE device having a memory;
   creating a secure, connected communication session with said BLE device;
   communicating validation information in said connected session;
   storing said validation information in said memory;
   receiving, in a connectionless session, a BLE packet broadcast including an advertisement string and validation data; and
   authenticating the source of said broadcast using said validation data contained in said BLE packet said validation information.

2. The method as in claim 1 wherein said authenticating is performed only once during said connectionless session.

3. The method as in claim 1 wherein said authenticating is performed a plurality of times at predetermined time intervals during said connectionless session.

4. The method as in claim 1 wherein said broadcast is received over an open channel.

5. The method as in claim 1 wherein said validation data is selected from a group consisting of: a sequence number and a shared key.

6. The method as in claim 1 wherein said authenticating comprises an Advanced Encryption Standard (AES) process.

7. The method as in claim 6 wherein said authenticating comprises a 4 AES process.

8. The method as in claim 1 wherein said authenticating comprises a Hash Based Message Authentication Code (HMAC) function.

9. The method as in claim 8 wherein said authenticating utilizes an SHA128 function.

10. A Bluetooth Low Energy (BLE) system comprising:
    a BLE radio transceiver;
    an electronic memory;
    a microprocessor to connect said BLE transceiver in a connected session, the microprocessor to receive validation information in said connected session and to store the validation information in said electronic memory, the microprocessor to further receive a BLE packet containing an advertising string and validation data in a subsequent connectionless session, and to authenticate said broadcasted advertising string by comparing said stored validation information and said received validation data contained in BLE packet.

11. The BLE system as in claim 10 wherein the validation data is selected from the group consisting of a sequence number and an encrypted Bluetooth device (BD) address, and a hash value.

12. The BLE system as in claim 10 and further including an authentication chip electrically connected to said microprocessor.

13. A product including a non-transitory storage medium having stored thereon instructions that, when executed by a machine, result in:
    creating a secure, connected Bluetooth low energy (BLE) communication link;
    exchange validation information over said secure, connected communication link;
    storing said validation information in said computer readable medium;
    generating validation data using said validation information;
    broadcasting a BLE packet containing an advertisement string and validating data from a BLE device in a connectionless session; and
    Transmitting said validation data along with said advertisement string in a BLE Packet.

14. The product as in claim 13 wherein said non-transitory storage medium includes instructions for encrypting a plaintext message.

15. The product as in claim 13 wherein said non-transitory storage medium includes instructions for encrypting a Bluetooth Device (BD) address.

* * * * *